United States Patent Office 3,120,564
Patented Feb. 4, 1964

3,120,564
ALKENOYLAMINO BENZOPHENONES
Jerry P. Milionis, South Bound Brook, Ralph A. Coleman, Middlesex, and Frank J. Arthen, Franklin Township, Somerset County, N.J., assignors to American Cyanamid Company, New York, N.Y., a corporation of Maine
No Drawing. Filed Jan. 13, 1960, Ser. No. 2,130
3 Claims. (Cl. 260—562)

This invention relates to new monomers for the preparation of polymeric materials which also have the property of selectively absorbing ultraviolet light and to the copolymers thereof. More specifically, this invention relates to compounds of the formula

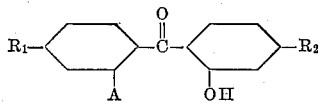

in which A is selected from the group consisting of hydrogen, hydroxyl, halogen and carboxy, $R_1$ may be alkenoylamino, alkenoyloxy, halogen, alkyl, phenyl, alkoxy or hydrogen, and $R_2$ may be hydrogen, alkyl, alkoxy, halogen, or alkenoyloxy, at least one of $R_1$ and $R_2$ being alkenoyloxy or alkenoylamino as permitted by the above definitions, the said alkenoylamino and alkenoyloxy groups having $CH_2=C<$ groups. More specifically also, this invention relates to polymeric materials comprising the polymers from the polymerization of compounds having a polymerizable $CH_2=C<$ group and including at least 0.01% by weight of the above products and also to polymerizable compositions of an unsaturated polyester, a polymerizable monomer containing a polymerizable $CH_2=C<$ group and a different monomer selected from the above-identified class of benzophenones.

The field of resin additives has seen in the past few years, the development of a new type of additive, namely the ultraviolet absorber. These are compounds which selectively absorb incident ultraviolet light and re-emit the energy in the form of heat or sometimes visible light. They consequently, protect the resin material from photo decomposition.

A good ultraviolet absorber for use in plastics should absorb the ultraviolet in sunlight and at the same time be a colorless material by visual observation. The compound should impart no color to the plastic composition, should be sufficiently stable to undergo the conditions of curing of the plastic, and should absorb ultraviolet light sufficiently to protect the composition against yellowing and decomposition on exposure to ultraviolet light. Furthermore, the compound must have sufficient solubility in various types of materials so that it may be easily incorporated into various plastic formulations. This latter property is especially important, since an incompletely dispersed product would give poor protection.

Generally, an effective ultraviolet absorber should have its peak absorption above a wave length of 320 millimicrons. The absorption peak may be at a higher wave length, as long as absorption drops off sufficiently as it approaches the visual range so that no visible color is shown by the compound. In addition, to be effective, it should show a high degree of absorbancy in the desired wave length range. However, for the most desirable ultraviolet light protection the high absorbancy should be at those wave lengths sufficiently below the visual range so that the compound has no yellow color visually.

A further deficiency of commercial UV absorbers is that many show a tendency to be leached out of plastics by solvents or to be lost by evaporation during the hot molding and other heat treatments to which the plastics may be subjected. Not only does this cause a loss of protection, but also there are uses in which loss by leaching is especially undesirable. Among these is the protection of transparent plastic packages for food from discoloration. It is highly undesirable, e.g., for a plastic bag for an oleaginous food to have an ingredient which the oil in the food will dissolve out of the bag. Such containers are usually not approved for use with food. Other uses where such leaching is deleterious include plastic dishes and utensils as well as containers.

More recently there has been suggested ultraviolet absorbers which contain copolymerizable groups. The original classes of ultraviolet absorbers were usually hydroxyalkoxy derivatives of benzophenone and, more recently, benzotriazoles. The first suggestions of copolymerizable groups have been to replace the alkoxy group with an alkenyloxy or to place an alkenyl group on a ring of a benzophenone. These compounds have been found to copolymerize and to give protection to plastics in which they form, in small amounts, one of the comonomers. However, the copolymerization efficiency of such compounds has proved to be wholly inadequate. Very seldom do more than 15% of the alkenyloxy benzophenones actually become part of the polymeric chain. The remainder of the material added is easily leached out by solvent extraction. Since these compounds are expensive, such an inefficient copolymerization results in very expensive protection and it is often cheaper to use the conventional ultraviolet absorber which is a mere additive and not a comonomer.

We have found that 2-hydroxybenzophenones which carry, on one or the other, or both rings of the benzophenone, either or both alkenoylamino and alkenoyloxy substituents, are efficient comonomers and, as such, provide extraordinary protection, from incident ultraviolet light, to polymeric materials in which it is copolymerized. The 2-hydroxybenzophenones which form our invention are described above and will be described below in more detail. We have also found that the copolymers of polymerizable ethylene compounds containing a $CH_2=C<$ polymerizable group with compounds of the above description are polymers of extraordinary stability to ultraviolet light.

The new comonomers of our invention are prepared by the reaction of amino and further hydroxy substituted 2-hydroxybenzophenones with an alkenoyl halide. A representative example of such a preparation is the reaction of 4'-amino-2-hydroxy-4-methoxybenzophenone with acrylyl chloride as shown by the following equation:

(1)
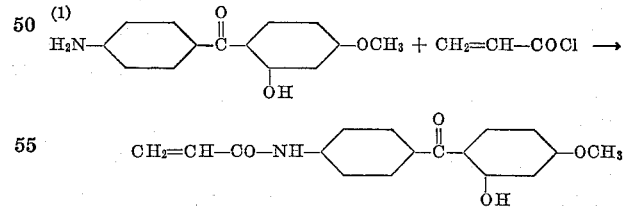

The alkenoyl halides which may be used in the preparation of the production of our invention include the acid chloride and the acid bromides of any alkenoic acid having a $CH_2=C<$ group. Among the alkenoic acids which may be used can be mentioned acrylic acid, methacrylic acid and undecylenic acid. Of these compounds, of course, the simpler and more available examples such as acrylic acid and methacrylic acid are to be preferred.

The amino benzophenones which may be used to form the amide types of comonomer within the scope of our invention have been described by Coleman, Arthen, Milionis and Foster in their copending application Serial No. 819,537, filed June 11, 1959, now U.S. Patent No. 3,057,921, issued October 9, 1962.

The aminobenzophenone intermediates used to prepare the amide type of monomer of our invention are characterized by the formula

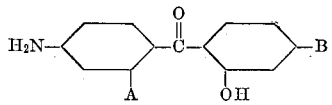

in which A may be hydrogen or hydroxyl and in which B may be hydrogen, alkyl, alkoxy or halogen.

The above compounds are prepared by reacting a paranitrobenzoyl chloride with the properly substituted anisole in the presence of aluminum chloride and simultaneously demethylating the resulting intermediate by heating. There is thus formed the 4-nitrobenzophenone which can be readily reduced to form the corresponding 4-aminobenzophenone. This preparation can be illustrated by the following schematic equation in which A and B have the same meaning as above.

(2)

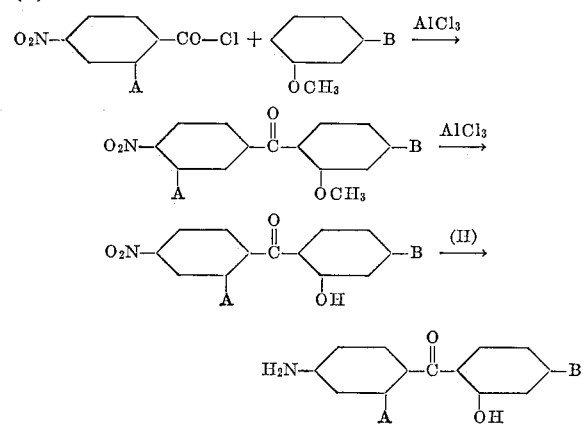

Since A can be hydrogen or hydroxyl, the benzoyl chloride starting material may be 4-nitrobenzoyl chloride or 4-nitrosalicyoyl chloride.

The other reagent can be meta halogen, alkoxy or alkyl derivatives of anisole. In the case of a meta-alkoxy anisole (i.e. a dialkyl resorcinol) only the alkoxy which is ortho to the carbonyl is dealkylated in the preparation of our invention under the conditions used. Thus for example, when 4-nitrobenzoyl chloride and meta-dimethoxybenzene are reacted in mono-chlorobenzene solution in the presence of aluminum chloride and the reaction mixture subsequently is heated, the reaction product is 4'-nitro-2-hydroxy-4-methoxybenzophenone.

Other alkoxybenzenes which may be used include m-dimethoxybenzene, m-diethoxybenzene, m-chloranisole, m-bromoanisole, m-methylanisole, m-propylanisole and the like.

An alternative synthesis for these compounds is to prepare 4-nitro di- or trihydroxybenzophenones and alkylate the hydroxyl not ortho to the carbonyl. Thus either p-nitrobenzonic acid or p-nitrosalicylic acid can be condensed with resorcinol in the presence of borontrifluoride. Alkylation of the resulting 4'-nitro-2,4-dihydroxybenzophenone or 4'-nitro-2,2',4-trihydroxybenzophenone with an alkylating agent results in the 4-alkoxy compound.

Such nitropolyhydroxybenzophenones are especially useful in preparing monomers of our invention in which both an alkenoylamino and an alkenoyloxy substituent is present. In such a case the nitropolyhydroxybenzophenone is esterified by an alkenoic acid, the nitro group is reduced and the resulting amino compound is reacted with the same or a different alkenoic acid. Alternatively the nitro group is first reduced and both the amino group and the para hydroxyls are simultaneously reacted with an alkenoyl halide.

(3)

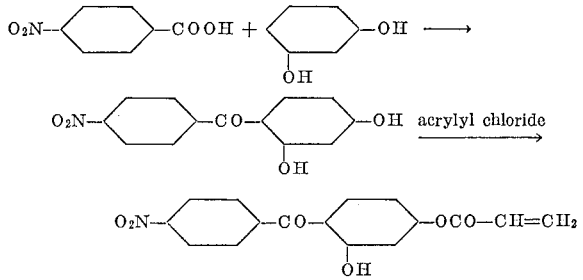

The nitro group can now be reduced to give the amino compound, which can then be acylated by an alkenoyl group.

Alkylating agents which can be used to form p-alkoxybenzophenones include diethylsulfate, butyl bromide, isobutyl bromide, octyl bromide, lauryl bromide and octadecyl bromide, as well as the butyl, lauryl, hexadecyl, or octadecyl esters of p-toluene sulfonic acid. It is generally preferable to prepare the 4-alkoxybenzophenones with alkyls above methyl by this route.

Reduction of the nitro compound gives the 4'-amino-2-hydroxybenzophenones of the general formula given above. This reduction can be carried out in any known way, either catalytically or with reducing agents such as sodium sulfide, iron and acetic acid and the like. Catalytic reduction is carried out usually over palladium and charcoal.

The ester type of monomer of our invention is prepared by the esterification of polyhydroxybenzophenones with an alkenoyl halide such as is described above. The polyhydroxy intermediates which also carry an amino group, and thus give monomers having both alkenoylamino and alkenoyloxy substituents, have been described above. The purely ester types are prepared by the esterification of such polyhydroxybenzophenones as 2,4-dihydroxybenzophenone, 2,2',4-trihydroxybenzophenone, 2,2', 4,4'-tetrahydroxybenzophenone, 2,4 - dihydroxy-4'-butylbenzophenone, 2,2',4-trihydroxy - 4' - methoxybenzophenone, 2,4 - dihydroxy-4'-methoxybenzophenone, 2,4-dihydroxy-4'-phenylbenzophenone, 4 - chloro-2',4'-dihydroxybenzophenone, 2,4'-dihydroxybenzophenone, 2,4,4'-trihydroxybenzophenone, 2' - carboxy-2,4-dihydroxybenzophenone, 2'-chloro-2,4-dihydroxybenzophenone, 2'-fluoro-2,4-dihydroxybenzophenone, 2',4'-dichloro - 2,4 - dihydroxybenzophenone and the like.

The new esters and amides of our invention can be incorporated in resins and plastics like any other UV absorber to give good protection. However, an especially important feature of our invention lies in the ability to copolymerize well with the monomers for the various plastics and thus become an integral part of the resin molecule. Such copolymerization can be carried out with any monomer containing ethylenic double bonds, such as ethylene, propylene, butylene, styrene, methyl styrene, ethyl styrene, propyl styrene, etc., acrylic acid and its esters and amides, methacrylic acid and its esters and amides, acrylonitrile, vinyl esters such as vinyl acetate and chloride, vinyl ethers such as vinyl butyral, dienes such as butadiene, isoprene, and chlorobutadiene, and such compounds.

They can also be included with unsaturated modifiers of polyester resins such as described in U.S. 2,255,313, U.S. 2,443,735, U.S. 2,443,736, U.S. 2,443,737, U.S. 2,443,739, U.S. 2,443,740 and U.S. 2,443,741, all of which patents are specifically incorporated therein by reference. Such resins are prepared from unsaturated polyester resins prepared from alpha, beta unsaturated poly carboxylic acids such as maleic, fumaric, aconitic, itaconic, monochloro maleic anhydride, and the like. These unsaturated acids are usually present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, that is, those which are free of non-benzenoid unsaturation, one could use such acids as oxalic, malonic, succinic, glutaric, sebacic, and chlorinated polycarboxylic acids such as tetrachlorophthalic anhydride, hexachloroendomethylene tetrahydrophthalic acid, and the like, but preferably in amounts less than a larger proportion of the total amount of polycarboxylic acid present.

Whenever available, the anhydrides of these acids may be used or mixtures of the acids or mixtures of the anhydrides thereof.

As polyhydric alcohols which may be used to prepare the unsaturated polyesters, it is preferred to make use of those alcohols having only two hydroxy groups although minor amounts of alcohols having three hydroxy groups, four hydroxy groups or more hydroxy groups may be used in minor amounts. As dihydroxy alcohols, one could use ethylene glycol, diethylene glycol, propylene glycol, dipropylene glycol, butanediol-1,4; butanediol-1,3; butanediol-1,2; pentanediol-1,2; pentanediol-1,3; pentanediol-1,4; pentanediol-1,5; hexanediol-1,5; and the like. Additionally, one could use glycerol, pentaerythritol, dipentaerythritol, and the like. The esterification of the alcohol is carried out until the acid number of the mixture has been reduced below 55.

The modifier for polyester resins is usually a polymerizable material having a $CH_2=C<$ group. Amongst these polymerizable compounds are styrene, side chain substituted styrenes such as the alpha methylstyrene, alpha ethylstyrene, and the like, or ring substituted styrene such as ortho, meta and para-alkyl styrenes such as o-methyl styrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disoloxane, and the like.

The modifier is used in a ratio from 10 parts to 90 parts of polyester up to 60 parts to 40 parts of polyester. Preferably, the range of 25 to 35 parts to 75 to 65 parts of polyester is used.

The new monomers of our invention can also be included with advantage in styrenated oil modified alkyd resins, in place of or in addition to the styrene. Such resins which are extensively used in coatings, are very well described in U.S. 2,713,039, U.S. 2,748,092 and U.S. 2,851,431, which are expressly incorporated herein by reference for the purpose of such disclosure. These resins are essentially the reaction products of drying oils and phthalic anhydride with polyhydric alcohols modified by reaction with styrene. The styrenation can take place before or after esterification of the acids by the alcohols or at intermediate stages. The new monomers of our invention are reacted at the same stages, just like the styrene, as desired.

The usage of the unsaturated amides and esters of our invention in the copolymers of our invention is usually small. A minimum of 0.01% by weight should be in the copolymer. Amounts of 0.5 to 2.0% are preferred. For special uses much larger amounts, sometimes as much as 20% can be used.

It is an advantage of the new monomers of our invention that they are copolymerized much more effectively with other ethylenic monomers and polymers than polymerizable ultraviolet absorbers heretofore known. It is an advantage of the polymers of our invention that they show much greater stability to deterioration from ultraviolet light than do polymers heretofore known and that this stability can be retained through all kinds of treatment such as hot molding and even through contact with solvents which, in the past, extracted the conventional ultraviolet absorber from the polymeric composition.

Our invention can be illustrated by the following examples in which parts are by weight unless otherwise specified.

*Example 1*

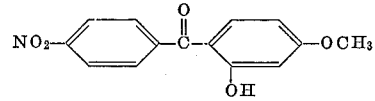

p-Nitrobenzoylchloride (90.8 parts), m-dimethoxybenzene (69 parts) and monochlorbenzene (333.2 parts) are mixed and cooled to 15° C. Aluminum chloride (84 parts) is added gradually while maintaining the temperature below 15° C. The mixture is then stirred at 10° for a short period. It is then gradually allowed to warm to 25° C. after which it is heated on a steam bath at 90° C. until the reaction is complete. The mixture is then drowned in ice water (700 parts) and the drowned mixture is heated on a steam bath to decompose the complex. It is then allowed to cool and the crystals which form are filtered off, recrystallized from a mixture of 1224 parts alcohol and 219.75 parts of benzene, filtered and dried.

*Example 2*

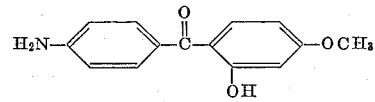

2-hydroxy-4-methoxy-4'-nitrobenzophenone (25 parts), glacial acetic acid (104.98 parts), and 10% palladium on charcoal (about 0.1 part) are placed in a hydrogenation autoclave. Hydrogen is run to 40 lb. pressure and the clave is shaken until a pressure drop of about twenty-three pounds occurs. The mixture is then heated on the steam bath, treated with acetone (79.2 parts), filtered, and the filtrate drowned in water (500 parts). The yellow solid which forms is filtered, washed with water, oven dried at 50° C. and recrystallized from alcohol to yield 4'-amino-2-hydroxy-4-methoxybenzophenone.

*Example 3*

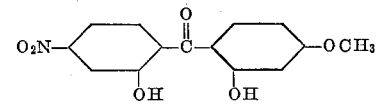

The procedure of Example 1 is repeated using an equivalent quantity of p-nitrosalicyloyl chloride in place of the p-nitrobenzoylchloride. The p-nitrosalicyloyl chloride may be prepared by heating p-nitrosalicylic acid with excess thionyl chloride using a small amount of pyridine as a catalyst.

*Example 4*

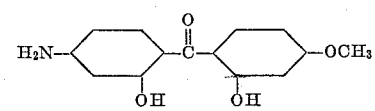

The procedure of Example 2 is followed using as starting material the product of Example 3.

*Example 5*

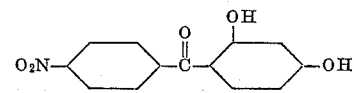

p-Nitrobenzoic acid (167 parts), resorcinol (110 parts), and monochlorobenzene (1000 parts) are slurried and heated to 50° C. Heating is discontinued and boron trifluoride (136 parts) is added. The temperature is raised to 90–100° C. and the mixture is stirred at this temperature until reaction is substantially complete. The mixture is drowned in a solution consisting of sodium acetate (200 parts) and water (1000 parts) and stirred a short while at 90–100° C. The solvent is removed by steam distillation. The residue is cooled and recrystallized from benzene.

*Example 6*

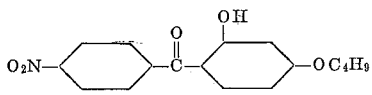

2,4-dihydroxy-4'-nitrobenzophenone (204 parts), butyl bromide (150 parts), sodium carbonate (53 parts), 95% alcohol (1000 parts) and water (300 parts) are stirred and refluxed until the reaction is substantially complete. The mixture is cooled and drowned in water. The solid which forms is filtered and recrystallized from 95% alcohol.

If, in place of butyl bromide in the above procedure, other alkyl bromides are used, e.g. octyl, dodecyl, and octadecyl bromides, one obtains the corresponding alkoxy benzophenones.

*Example 7*

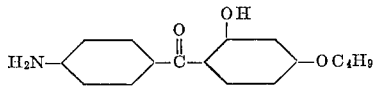

By reduction of the product of Example 6 using the procedure similar to that described in Example 2, 2-hydroxy-4-butoxy-4-aminobenzophenone is obtained.

Corresponding homologous products are obtained by a similar procedure.

*Example 8*

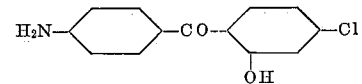

The procedure of Example 1 is followed using an equivalent quantity of m-chloranisole in place of the dimethoxybenzene. The product is reduced by the procedure of Example 2.

Similarly, the use, instead of m-chloranisole, of m-methylanisole and m-bromoanisole in this procedure results in the correspondingly substituted product.

*Example 9*

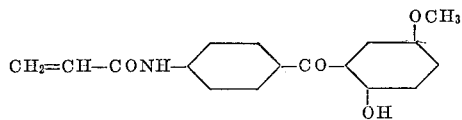

A slurry of 3.16 parts of the product of Example 2 in 75 parts by volume of monochlorobenzene is added in small portions to 1.18 parts of acrylyl chloride in 25 parts by volume of monochlorobenzene, to which 1.19 parts of pyridine and 0.1 part of hydroquinone have been added. The temperature of addition is −5 to 0° C. The mixture is stirred at this temperature for a short time and then at room temperature (25–30° C.) until the reaction is substantially complete. Recrystallization from alcohol and water and then from mono-chlorobenzene yields a yellow solid.

*Example 10*

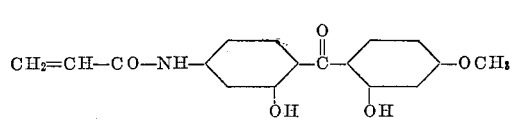

The procedure of Example 9 is followed using an equivalent quantity of the product of Example 4 in place of that of Example 2.

*Example 11*

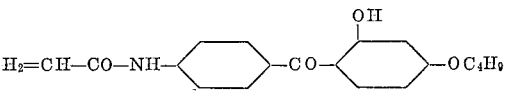

The procedure of Example 9 is followed using an equivalent quantity of the product of Example 6 in place of the product of Example 2.

*Example 12*

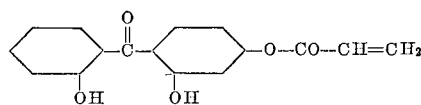

Acrylyl chloride (4.53 parts) is added dropwise to a solution of 2,4,2'-trihydroxybenzophenone (11.5 parts) in 100 parts by volume of water containing 2.0 parts of sodium hydroxide at 0–5° C. Stirring is continued until the reaction is substantially complete. The solid is collected by filtration and recrystallized from alcohol.

*Example 13*

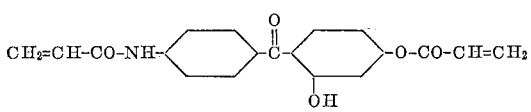

The compound of Example 5 is reduced to 4'-amino-2,4-dihydroxybenzophenone by method described in Example 2. The product is then reacted with acrylyl chloride as described in Example 12 but using two equivalents. Methacrylyl chloride can be used in place of acrylyl chloride.

*Example 14*

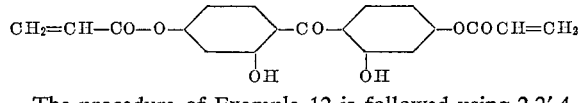

The procedure of Example 12 is followed using 2,2',4,4'-tetrahydroxybenzophenone, in half the equivalent amount, in place of the trihydroxybenzophenone used there.

*Example 15*

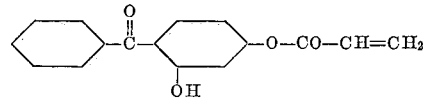

The procedure of Example 12 is followed using an equivalent amount of 2,4-dihydroxybenzophenone in place of the trihydroxybenzophenone.

*Example 16*

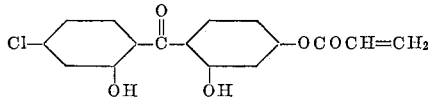

The procedure of Example 12 is followed using an equivalent amount of 2,4,2'-trihydroxy-4'-chlorobenzophenone (prepared by the condensation of 4-chlorosalicylyl chloride with resorcinol) in place of trihydroxybenzophenone. Similarly, when the 4'-bromo, 4'-methyl, 4'-butyl, 4'-methoxy, and 4'-butoxy analogs of this 4' Cl trihydroxybenzophenone are used the correspondingly substituted product is obtained.

*Example 17*

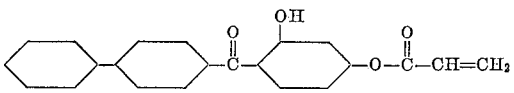

The procedure of Example 12 is followed using an equivalent amount of 2,4'-dihydroxy-4'-phenylbenzophenone in place of the trihydroxybenzophenone. Similarly, when 2'-carboxy-2,4-dihydroxybenzophene or 2'-chloro-2,4-dihydroxybenzophenone is used in equivalent amounts in place of the 4'-phenyl compound, the corresponding 2'-chloro and 2'-carboxy compounds are formed.

*Example 18*

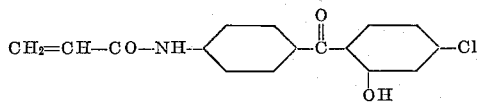

The procedure of Example 9 is followed using the 2-hydroxy-4-chloro-4'-aminobenzophenone prepared in Example 8 in amounts equivalent to the usage in Example 9 of hydroxy methoxybenzophenone. Similarly, when the other substituted benzophenones described in Example 8 are used, the correspondingly substituted benzophenone is obtained.

*Example 19*

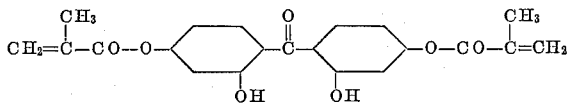

The procedure of Example 14 is followed using an equivalent amount of methacrylyl chloride in place of acrylyl chloride. Similarly, when undecylenyl chloride is used the correspondingly substituted benzophenone is obtained. When these acids are substituted for acrylyl chloride in Examples 9, 10, 11, 12, 13, 15, 16, 17 and 18, the correspondingly substituted benzophenones are obtained.

*Example 20*

A mixture of 9 parts of styrene and about 1 part of the compound of Example 9 is heated in the presence of 0.1 part of benzoyl peroxide as a catalyst at 80° C. for about 8 hours and 100° C. for about 72 hours in a closed container.

The resulting copolymer is added to benzene and, after complete solution, it is precipitated by the addition of an excess of ethanol. After removal it is further extracted with ethanol to remove unreacted benzophenone compound from the formed copolymer.

*Example 21*

0.5 gram of the product of Example 15 and 0.05 gram of benzoyl peroxide are placed in a Pyrex tube. 4.5 grams of styrene are added. The tube is flushed with nitrogen and then sealed. The mixture is heated at 120° C. for 100 hours. The copolymer is dissolved in toluene and precipitated in an excess of alcohol. It is then given several washings with hot alcohol. Analysis shows that the major portion of the product of Example 12 has copolymerized with the styrene.

A small amount of the copolymer is dissolved in hot toluene. This solution is brushed on a white pine panel. A very thin film is formed on the surface of the wood. A control sample is prepared by dissolving polystyrene in hot toluene and brushing this solution on a white pine panel. These two panels, along with a third panel which has no overcoating, are exposed in a Fade-Ometer for 14 hours. Both control samples become badly discolored, while the sample containing the UV absorbing copolymer shows only a slight discoloration.

When, in place of the product of Example 12, equivalent quantities of the products of Examples 11, 12, 16 and 17 are used, similar products are obtained.

*Example 22*

1 part of the copolymer described in Example 21 is milled with 49 parts of polystyrene. Chips, 50 mils thick, are molded and exposed in the Fade-Ometer along with control chips. After 100 hours exposure the control shows considerably more yellowing as measured on a differential colorimeter.

*Example 23*

A mixture of 95 parts of a resin mixture comprising a polyester of excess propylene glycol with equal mole quantities of phthalic and maleic anhydrides, blended with 50% of its weight of styrene, 4.75 parts of additional styrene, 0.25 part of the product of Example 15 and 0.50 part of benzoyl peroxide is poured into a mold made of glass plates and cured in an oven for 30 minutes at 80° C., 30 minutes at 105° C. and 1 hour at 120° C. The product is an ultraviolet light resistant resin composition.

When the products of Examples 9, 11 and 17 are substituted in equivalent quantities for the 4-acryloxy-2-hydroxybenzophenone of Example 15, similar products are obtained.

*Example 24*

A solution of 2.4 parts of dihexyl sodium sulfosuccinate and 0.13 part of sodium bicarbonate in 165 parts of deionized water is heated to 90° C. while maintaining a nitrogen atmosphere. There is then added gradually 36 parts of acrylonitrile, 74 parts of styrene and 10 parts of the monomer from Example 15. At the same time there is added 2.4 parts of $(NH_4)_2S_2O_8$ in 15 parts of water, in several portions. After the reaction is complete, excess acrylonitrile and styrene are removed by steam distillation. The polymer is coagulated, washed and dried. This polymer is used in conjunction with alkyd resins to form surface coatings.

2.5 parts of the above tripolymer is milled into 97.5 parts of styrene-acrylonitrile (84:36) copolymer and molded into 50 mil chips. These, along with unmodified styrene acrylonitrile (84:36) chips, are exposed in the Weatherometer. The control becomes discolored while the material containing the UV absorbing comonomers shows little change.

When the compounds of Examples 9, 10, 11, 12, 16 and 17 are used in place of the product of Example 15, similar products are obtained.

*Example 25*

A mixture of 4 parts of $(NH_4)_2S_2O_8$, 12 parts of sodium cetyl sulfate and 800 parts of water is adjusted to pH of 8 with sodium hydroxide. Nitrogen is bubbled through the solution for a short time. Then 320 parts of butyl methacrylate and 80 parts of the product of Example 15 are added and a slow stream of nitrogen is passed over the surface. The temperature is raised to 55° C. and maintained there until the reaction is substantially complete. The polymer is separated by freezing the latex and is washed with water and dried at 45° C. This copolymer, in combination with ethyl cellulose or nitrocellulose, can be used as a wood finishing lacquer or as a coating for fabric.

When the products of Examples 9, 10, 11, 12, 16, or 17 are substituted for that of Example 15, similar products are obtained.

*Example 26*

A reaction mixture containing methyl methacrylate (7 parts), 2,2'-dihydroxy-4-acryloxybenzophenone of Example 15 (0.5 part), stearic acid (.075 part), benzoyl peroxide (.04 part), sodium salt of polyacrylic acid (.06 part), sodium sulfate (.19 part) in 24 parts of water is flushed with nitrogen and then maintained at 120° C. for several hours with stirring. The copolymer is collected, and dried.

When the products of Examples 9, 10, 11, 12, 16 or 17 are used in place of the product of Example 15, similar products are obtained.

*Example 27*

A mixture of 2 parts of the product from methacrylate with a small amount of benzoyl peroxide as a catalyst is heated in sheet cells at 60° C. for 30 hours followed by 10 hours at 125° C. The resulting polymer is resistant to discoloration by UV light.

Example 28

The following emulsion is agitated at 40° C. for about 5 days.

| | Parts |
|---|---|
| Acrylamide | 25 |
| 1,3-butadiene | 74.5 |
| Product of Example 14 | .5 |
| Sodium palmitate | 5 |
| Diazoaminobenzene | 0.75 |

The resulting latex-like dispersion is coagulated whereupon a soft elastic polymer is obtained.

Example 29

A mixture of 75 parts of butadiene, 24.5 parts of styrene, 0.5 part of the product of Example 12, 0.5 part of dodecylmercaptan, 180 parts of water, 0.3 part of potassium persulfate, and 5.0 parts of sodium stearate is stirred vigorously to form an emulsion. The emulsion is autoclaved and maintained at 50° C. for 16 hours. The resulting latex is treated with sodium chloride solution followed by addition to the dilute sulfuric acid bath. The crumbs that are formed are filtered, washed and dried at 60° C.

We claim:

1. A compound of the formula:

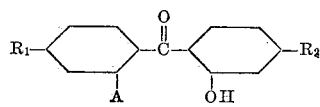

wherein A is a member selected from the group consisting of hydrogen and hydroxyl, $R_1$ is a member selected from the group consisting of acrylylamino and methacrylylamino and $R_2$ is a member selected from the group consisting of hydrogen, alkoxy of up to eighteen carbon atoms, halogen, acrylyloxy and methacrylyloxy.

2. The compound

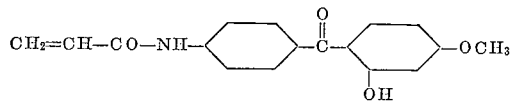

3. The compound

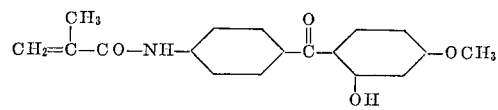

References Cited in the file of this patent

UNITED STATES PATENTS

| 2,384,811 | Coleman et al. | Sept. 18, 1945 |
| 2,609,353 | Rubens et al. | Sept. 2, 1952 |
| 2,773,899 | Martin et al. | Dec. 11, 1956 |
| 2,894,932 | Bader et al. | July 14, 1959 |
| 2,938,883 | Raich | May 31, 1960 |